(12) United States Patent
Beerwerth et al.

(10) Patent No.: US 6,762,589 B2
(45) Date of Patent: Jul. 13, 2004

(54) CIRCUIT FOR CHARGING RECHARGEABLE BATTERIES HAVING A COMBINED CHARGING AND OVERVOLTAGE PROTECTION CIRCUIT

(75) Inventors: Rolf Beerwerth, Bönen (DE); Christian Kranz, Ratingen Lintorf (DE); Hans-Gerd Kirchhoff, Ratingen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/449,386

(22) Filed: May 30, 2003

(65) Prior Publication Data

US 2003/0218446 A1 Nov. 27, 2003

Related U.S. Application Data

(63) Continuation of application No. PCT/DE01/04498, filed on Nov. 27, 2001.

(30) Foreign Application Priority Data

Nov. 30, 2000 (DE) .......................................... 100 59 523

(51) Int. Cl.⁷ .............................................. H01M 10/46
(52) U.S. Cl. ....................................................... 320/128
(58) Field of Search ................................ 320/128, 132, 320/134, 136, 139, 151, 157, 162, 164

(56) References Cited

U.S. PATENT DOCUMENTS 5,039,931 A  8/1991 Wieland
5,596,259 A  1/1997 Mino et al.
6,227,204 B1  5/2001 Baumann et al.

FOREIGN PATENT DOCUMENTS

| DE | 3106171 A1 | 9/1982 |
| DE | 19838137 A1 | 3/2000 |
| EP | 0580180 A1 | 1/1994 |
| EP | 0757422 A2 | 2/1997 |
| WO | 00/16462 | 3/2000 |

OTHER PUBLICATIONS

D.C. Hamill et al.: "Advances in Battery Charging for Portable Video: Low–Cost, Microcomputer–Controlled Fast Charging For Ni–Cards", SMPTE Journal, Mar. 1985, pp. 296–304.

Dipl.–Ing. J. Iseli et al.: "Empfindlichkeit und Schutz integrierter Schaltungen gegen Überspannungen", elektronik praxis, No. 7/8, Aug. 1972, pp. 7–12, pertains to the sensitivity and protection of integrated circuits against overvoltages.

*Primary Examiner*—Edward H. Tso
(74) *Attorney, Agent, or Firm*—Laurence A. Greenberg; Werner H. Stemer; Ralph E. Locher

(57) ABSTRACT

A rechargeable battery unit, which is intended for supplying a voltage to an electrical appliance, is charged by an external charging voltage by a charging circuit. The charging circuit is configured such that a charge regulator controls the charging process, and a monitoring unit monitors the voltage that is applied to the rechargeable battery unit and causes the charging regulator to limit the voltage that is applied to the rechargeable battery unit if any over-voltage occurs.

16 Claims, 2 Drawing Sheets

CIRCUIT FOR CHARGING RECHARGEABLE BATTERIES HAVING A COMBINED CHARGING AND OVERVOLTAGE PROTECTION CIRCUIT

CROSS-REFERENCE TO RELATED APPLICATION

This application is a continuation of copending International Application No. PCT/DE01/04498, filed Nov. 27, 2001, which designated the United States and was not published in English.

BACKGROUND OF THE INVENTION

Field of the Invention

The invention relates to a charging circuit for charging a rechargeable battery unit, with the rechargeable battery unit supplying an electrical appliance with voltage, and to a method for charging a rechargeable battery unit by an external charging voltage.

The present commercial requirements result in the manufacturers of electrical and electronic appliances having to produce ever smaller appliances. In this case, the progress in the miniturization of electronic assemblies allows the production of convenient appliances, which can be used in a mobile form. A pronounced trend in this direction can be observed in particular in the field of telecommunications. This relates primarily to appliances such as mobile telephones, cordless telephones, pagers, palmtops, etc. Since these appliances are not connected to any mains supply, they must be operated via rechargeable batteries. In this case, it must be possible to charge the rechargeable batteries in the appliance itself. For example, the rechargeable battery that is located in the portable handset of a cordless telephone must be capable of being recharged via the associated base station. It would not be acceptable for the rechargeable battery to have to be removed from the appliance in advance for charging.

This requirement results in that not only the rechargeable battery but also the appliance which is operated by the rechargeable battery remains in contact with a charging voltage via the charging circuit throughout the charging process, with the charging voltage generally being obtained from the mains voltage. There is a risk of an incorrect (excessively high) charging voltage being applied to the appliance. In some circumstances, the mains voltage may also be subject to considerable short-term fluctuations. The electrical appliance must therefore be protected against being destroyed by excessively high voltages, by over-voltage protection circuits.

Discrete components are generally used for this purpose. Zener diodes are frequently used in this case. These diodes are characterized by a precisely defined breakdown voltage, at which the reverse current rises steeply. If the applied voltage exceeds the breakdown voltage, then the impedance of the zener diode in consequence becomes low. The voltage that is applied to the zener diode is thus always limited to the breakdown voltage.

SUMMARY OF THE INVENTION

It is accordingly an object of the invention to provide a circuit for charging rechargeable batteries that overcomes the above-mentioned disadvantages of the prior art devices of this general type, in which the complexity resulting from discrete components is reduced.

With the foregoing and other objects in view there is provided, in accordance with the invention, a charging circuit for charging a rechargeable battery unit with an external charging voltage, with the rechargeable battery unit supplying an electrical appliance with a voltage. The charging circuit contains a charging contact for connecting to the external charging voltage, and a charge regulator for controlling a current and/or a voltage profile of a charging process. The charge regulator has a control transistor through which a charging current flows, and a series transistor with a collector-emitter path connected to the control transistor and through the collector-emitter path a control current of the control transistor flows. The series transistor has a base connection electrically coupled to the charging contact. A monitoring unit is provided for comparing a signal representing a given voltage applied to the rechargeable battery unit, with a predetermined maximum value, and, if the predetermined maximum value is exceeded, the monitoring unit causes the charge regulator to switch off or reduce the given voltage applied to the rechargeable battery unit.

The present invention relates to a charging circuit for charging a rechargeable battery unit by an external charging voltage, with the rechargeable battery unit supplying an electrical appliance with voltage. The charging circuit has a charging regulator, which controls the current and/or voltage profile of the charging process. Furthermore, the charging circuit has a monitoring unit, which compares a signal, which represents the voltage that is applied to the rechargeable battery unit, with a predetermined maximum value and, if this maximum value is exceeded, causes the charging regulator to switch off or to reduce the voltage that is applied to the rechargeable battery unit.

Electrical appliances which are powered by a rechargeable battery unit have until now been equipped with a charging regulator for controlling the charging process, and with additional components in order to protect the rechargeable battery unit and the electrical appliance against overvoltages. With the present invention, the charging regulator carries out both functions, that is to say it controls the process of charging the rechargeable battery unit while at the same time being used for protection against over-voltages when the monitoring unit indicates to it that an excessive voltage has occurred. This makes it possible to save additional, discrete components, such as zener diodes, which were used for over-voltage protection. In consequence, owing to the saving of discrete components, the charging circuit according to the invention allows the electrical appliance to be produced at a lower cost and to be more compact. The rechargeable battery unit can remain in the electrical appliance during the charging process.

If the predetermined maximum voltage is exceeded, the voltage that is applied to the rechargeable battery unit can either be switched off or reduced. The simplest solution is to completely switch off the voltage that is applied to the rechargeable battery unit when a predetermined maximum value is exceeded. This embodiment can be implemented by a simple comparison circuit.

A solution in which the voltage is only limited and is not switched off completely has the advantage that the electrical appliance is still supplied with a voltage, despite the excess voltage. This may be a critical factor for many applications, for example in the case of appliances with volatile electronic memories. The data stored there would be lost if the supply voltage were switched off completely.

One preferred embodiment of the charging circuit according to the invention provides for the charging regulator to have a control transistor through which the charging current flows. In this embodiment, the control transistor is the central component for controlling the charging of the rechargeable battery unit. The desired charging current can be set by the control transistor.

According to a further advantageous embodiment of the invention, the monitoring unit as well as parts of the charging regulator are implemented on a common silicon substrate, while the control transistor is in the form of a discrete component. All the control electronics for controlling the sequence of the charging process as well as the voltage monitoring for detection of over-voltages can be accommodated in an integrated circuit. The control transistor is a discrete component, in the form of the only power component. The control electronics are supplied with a signal that represents the voltage that is applied to the rechargeable battery unit. The control connection of the control transistor (the gate connection when using an FET, and the base connection when using a bipolar transistor) is connected to the integrated circuit in order to make it possible to use the control transistor to check the charging current by the integrated control electronics. One control transistor, which is connected to the integrated control electronics via two signal lines, is thus sufficient for providing combined charging regulation with over-voltage protection.

It is advantageous for the control transistor to be a field-effect transistor, via whose source-drain path the charging current flows. The charging current and/or the voltage that is applied to the rechargeable battery unit may in this case be adjusted via the gate potential of the control transistor. Thus, all that is necessary to vary the charging current is to change the charge on the gate electrode of the FET. Since no permanent control current flows, the use of an FET as a power transistor allows the charging current to be controlled with no losses and quickly.

As an alternative to this, the control transistor may be a bipolar transistor, via whose collector-emitter path the charging current flows. In this case, the voltage that is applied to the rechargeable battery unit can be adjusted via the base current of the control transistor. If a high base current flows, then the resistance between the collector and emitter of the control transistor is small, and a high charging current can thus flow. In contrast, if the base current is small, only a small charging current flows, as well. The charging process cannot only be switched on and off, but can also be controlled by varying the base current. This has the advantage that, for example, the magnitude of the charging current as well as its time profile can be matched to the state of charge, the capacity and to the type of rechargeable battery unit.

In a situation where the signal that represents the voltage that is applied to the rechargeable battery unit exceeds the predetermined maximum value, the base current of the control transistor is advantageously reduced. Reducing the base current not only reduces the charging current but also results in a higher voltage being dropped between the collector and the emitter of the control transistor. This measure provides effective protection for the rechargeable battery unit and for the assemblies disposed downstream against excessively high voltage values. The base current is reduced such that the voltage that is applied to the rechargeable battery unit is reduced to a level that can still be tolerated by the assemblies that are disposed downstream, and the voltage supplied to these assemblies is still maintained.

However, alternatively, it is also possible to switch the base current to the control transistor off completely in the event of an excess voltage, in order to completely decouple the externally applied charging voltage from the rechargeable battery unit and from the assemblies that are disposed downstream. In this case, the transistor is used just as a switch, which isolates the initially applied charging voltage from the appliance when a maximum voltage is exceeded.

The control transistor is always the major item in all the preferred embodiments of the invention described so far. It combines both of the requirements which are placed on the charging regulator in just one component: first, the charging process can be controlled by the control transistor while, second, the rechargeable battery unit and the assemblies which are disposed downstream can be effectively protected against over-voltages by the control transistor. No more components are therefore required, such as zener diodes, for over-voltage protection. A transistor is a comparatively small and low-cost electronic component, which can be configured for any power requirement and has a robust control response. The charging circuit according to the invention can thus be produced such that it is compact and has a low cost.

According to a further preferred embodiment of the invention, the charging regulator has a series transistor, via whose collector-emitter path the base current of the control transistor flows. This allows the base current of the control transistor to be controlled, and hence also the charging current for the rechargeable battery unit, via the base current of the series transistor. The charging voltage that is applied between VCHARGE+ and VCHARGE− is generally not the same as the supply voltage for the integrated circuit on which the charging regulator is located. The series transistor makes it possible to ensure that the base current for the control transistor can be reduced to zero despite the different voltage levels. To this extent, the series transistor decouples the two voltage levels.

One advantageous embodiment of the invention provides for the charging circuit to have a timer that controls the start and end of the charging process. This measure represents a simple option for limiting the charging time and for protecting the rechargeable batteries against being overcharged, in this way. This lengthens the life of the rechargeable batteries. The charging time is in this case matched to the type of the rechargeable batteries used.

The timer may also be configured such that it allows the rechargeable battery unit to be charged at regular intervals. This makes it possible to ensure that the electrical appliance is always ready for use. If necessary, the time interval between two successive charging processes must be shortened, if the heavy load is placed on the electrical appliance. According to a further advantageous embodiment of the invention, the charging circuit controls the charging process as a function of the state of charge and/or of the charge capacity of the rechargeable battery unit. In order to make it possible to use the charging circuit according to the invention as universally as possible, the state of charge and the charge capacity of the rechargeable batteries being used are recorded, in order then to charge the rechargeable batteries in an appropriate manner. Recording the state of charge and the charge capacity on the one hand makes it possible to prevent overcharging of the rechargeable batteries. Furthermore, the profile of the charging process can be matched to the type of rechargeable battery. Some electronic appliances, in particular laptops and mobile telephones, can be delivered with different rechargeable battery units, which differ with regard to the quality, capacity, electrochemical composition, life and price. Recording the rechargeable battery type makes it possible to match the charging current, the charging time, the profile of the charging current and charging voltage, etc. to the type being used.

In order to discharge the rechargeable batteries being used as completely as possible before the charging process, a sequence of charging and discharge processes can be carried out. This lengthens the life of the rechargeable batteries.

In the case of rapid charging processes, the relatively large amount of charge that is transferred within a short time can result in a considerable amount of heat being produced. In order to avoid the production of this heat, it is advantageous to connect the external charging voltage to the accumulator unit using the pulsed mode. A high charging current flows at the start of the charging process, and the phases during which the charging current is switched on are therefore considerably shorter than the phases during which it is switched off and during which the rechargeable batteries are decoupled from the external charging voltage, for cooling purposes. As the charging process continues, the charging current decreases, and the phases in which the charging current is switched on and off can be made more similar to one another.

In order to avoid overheating of the rechargeable battery unit and of the appliance, it is also possible to record the temperature of the rechargeable battery unit during the charging process. In the event of overheating, the charging current could be reduced or the charging process interrupted.

It is advantageous for the monitoring unit to have an analog/digital converter, which digitizes the signal and represents the voltage that is applied to the rechargeable battery unit. The digitized signal can then in each case be compared with the predetermined maximum value, in order to identify over-voltages.

According to a further preferred embodiment of the invention, the charging circuit has a signal line for charging voltage identification, via which the electrical appliance can be supplied with voltage. This has the advantage that the voltage supply for the charge regulator and for the electrical appliance can be maintained when the rechargeable battery unit is removed or discharged.

In a further advantageous embodiment of the invention, the signal line for charging voltage identification is connected to the base connection of the series transistor. No charging current can flow through the control transistor unless the base-emitter voltage of the series transistor is greater than a specific value and a base current is flowing through the series transistor. The connection between the signal line for charging voltage identification and the base of the series transistor thus ensures that the charging current can flow only when a sufficiently high external charging voltage is applied. When no external charging voltage is applied, the series transistor is switched off. This prevents the rechargeable battery from being discharged via the externally accessible charging contacts (for example as a result of a short circuit or creepage currents).

It is advantageous for any over-voltages that occur on the signal line for charging voltage identification to be dissipated by a shunt regulator. The shunt regulator protects the signal line for charging voltage identification against over-voltages in that, above a predetermined voltage level, it dissipates a sufficient amount of current, for example to ground, so that the voltage on the signal line for charging voltage identification cannot rise any further.

According to a further advantageous embodiment of the invention, it is possible to use the signal line for charging voltage identification to measure whether an external charging voltage is applied. The control transistor for the charging current is switched on only when a sufficiently high external charging voltage is applied.

The signal line for charging voltage identification is advantageously decoupled from the rechargeable battery unit during the measurement process just described. This is because it is, in fact, possible for the rechargeable battery unit to produce a voltage on the signal line for charging voltage identification across the emitter-collector path through the control transistor, which voltage would then be incorrectly identified as an external charging voltage. In consequence, the decoupling ensures that only the external charging voltage is actually measured when measuring the voltage on the signal line for charging voltage identification.

The method according to the invention for charging a rechargeable battery unit by an external charging voltage, with the rechargeable battery unit supplying an electrical appliance with voltage, contains the following steps:

a) control of the current and/or voltage profile of the charging process by a charge regulator;

b) comparison of a signal, which represents the voltage which is applied to the rechargeable battery unit, with a predetermined maximum value; and c) if the maximum value is exceeded, causing the charge regulator to switch off or reduce the voltage which is applied to the rechargeable battery unit.

In this method, the charge regulator carries out the function of controlling the charging process for the rechargeable battery unit, while on the other hand the rechargeable battery unit and the assemblies that are disposed downstream can be protected against over-voltages by the charging regulator.

Until now, separate components have been used for over-voltage protection. These can now be saved.

Other features which are considered as characteristic for the invention are set forth in the appended claims.

Although the invention is illustrated and described herein as embodied in a circuit for charging rechargeable batteries, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
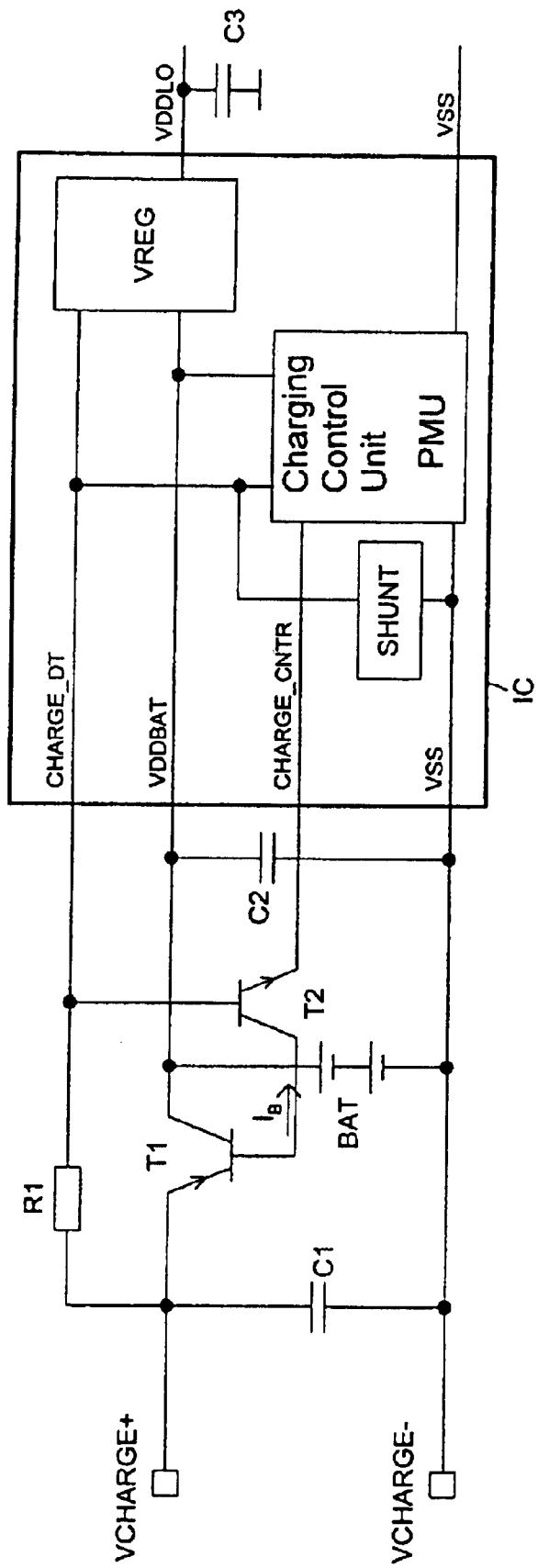
FIG. 1 is a circuit diagram of the first exemplary embodiment of a charging circuit according to the invention.

Referring now to the figures of the drawing in detail and first, particularly, to FIG. 1 thereof, there is shown a rechargeable battery unit BAT, which can be charged via an external charging voltage which is connected to the charging contacts VCHARGE+ and VCHARGE−. The rechargeable battery unit BAT supplies a voltage to an electrical appliance. For this purpose, a positive pole of the rechargeable battery unit BAT is connected to a signal line VDDBAT; a negative pole is connected to a common, fixed potential which may, in particular, be ground VSS. The electrical appliance is likewise connected to the signal line VDDBAT and to ground VSS. In consequence, the signal line VDDBAT can be used to tap off the voltage produced by the rechargeable battery unit BAT and/or the voltage applied to the rechargeable battery unit BAT. In the exemplary embodiment, the rechargeable battery unit BAT contains two rechargeable batteries connected in series.

Furthermore, the charging contacts VCHARGE+ and VCHARGE− are connected to one another via a capacitor C1. The two poles of the rechargeable battery unit BAT are likewise connected via a capacitor C2. The capacitors C1 and C2 are each used for smoothing the applied voltages.

A control transistor T1 is connected between the charging contact VCHARGE+ and the positive pole of the rechargeable battery unit BAT. The control transistor T1 is a pnp transistor, whose emitter connection is connected to the charging contact VCHARGE+ and whose collector connection is connected to the signal line VDDBAT. A charging current for the rechargeable battery unit BAT flows via the emitter-collector path through the control transistor T1, provided that the charging contacts VCHARGE+ and VCHARGE− are connected to a sufficiently high external charging voltage, and provided that a sufficiently large base current $I_B$ is flowing via the base of the control transistor T1.

The charging current can be both switched on and off and controlled via the base current $I_B$ of T1. To do this, it is necessary to be able to emit a current from the base of the control transistor T1. This is done via a series transistor T2. The series transistor T2 in this exemplary embodiment is formed by an npn transistor. The collector connection of the series transistor T2 is connected to the base connection of the control transistor T1, and the emitter connection is connected to a signal line CHARGE_CNTR. The base current $I_B$ of the control transistor T1 flows via the collector-emitter path of the series transistor T2.

The signal lines VDDBAT, CHARGE_CNTR and ground VSS are connected to a charging control unit PMU. The charging control unit PMU measures the voltage produced by the rechargeable battery unit BAT, via the signal line VDDBAT, with the control transistor T1 switched off. When it is intended to charge the rechargeable battery unit BAT, the signal line CHARGE_CNTR is connected by the charging control unit PMU to a current sink. The base current $I_B$ of the control transistor T1 can then flow away to ground VSS. In fact, this is done only when the base-emitter voltage of the series transistor T2 is sufficiently large. The base of the series transistor T2 is connected via a resistor R1 to the charging contact VCHARGE+. If an external voltage is applied to both the charging contacts VCHARGE+ and VCHARGE−, then a base current flows through T2, and the base current $I_B$ can flow via the emitter-collector path through T2. If, in contrast, the two charging contacts VCHARGE+ and VCHARGE− are not connected to an external charging voltage, then the voltage which is applied to the base of the series transistor T2 does not allow any current to flow through the base of the control transistor T1, and thus does not allow any charging current to flow through the rechargeable battery unit BAT, either. This ensures that the rechargeable battery unit BAT cannot be inadvertently discharged.

The charging control unit PMU controls—via the base current $I_B$ through T1—the charging current through the rechargeable battery unit BAT. At the same time, the charging control unit PMU uses the signal line VDDBAT to record the voltage that is applied to the rechargeable battery unit BAT. In this case, it is also possible to provide for the charging control unit PMU to measure the state charge and/or the charge capacity of the rechargeable battery unit BAT, and then to use the parameter to optimize the charging process. Furthermore, different charging and discharge cycles, which are defined by the charging control PMU, for the rechargeable battery unit BAT can also be carried out during the charging process. This procedure may be worthwhile, since it lengthens the life of the rechargeable battery unit BAT.

The charging control unit PMU can use the signal line for charging voltage identification CHARGE_DT, which is connected to the charging contact VCHARGE+ via the resistor R1, to determine whether any external charging voltage whatsoever is applied to the charging contacts VCHARGE+ and VCHARGE−. In order to allow the external charging voltage to be measured, the control transistor T1 is driven in a pulsed manner since the inverse current through the control transistor T1 would result in a voltage being built up at the charging contacts VCHARGE+ and VCHARGE− even without any external charging voltage. The charging control unit PMU does not start the charging process for the rechargeable battery unit BAT unless an external charging voltage is applied.

The signal line for charging voltage identification CHARGE_DT is also used for a second purpose: if the rechargeable battery unit is discharged or has been removed from the appliance, the electrical appliance can be supplied with voltage from the external charging voltage via the signal line CHARGE_DT.

So far, the components of this exemplary embodiment of the invention have been described only in terms of their function in contributing to the charging of the rechargeable battery unit BAT. However, some of these components also carry out a second function as over-voltage protection elements. The external charging voltage can result in over-voltages, which would endanger both the rechargeable battery unit BAT and the assemblies of the electrical appliance.

The rechargeable battery unit BAT and the other assemblies that are connected to the signal line VDDBAT are protected against over-voltages via the control transistor T1. This is done first by the charging control unit PMU detecting the over-voltage on the signal line VDDBAT and then minimizing the base current $I_B$ through the control transistor T1 to such an extent that sufficient voltage is dropped across the emitter-collector voltage of the control transistor T1. It is also possible to provide for the base current of the control transistor T1 to be switched off when an over-voltage occurs, in order to decouple the relevant assemblies from the external charging voltage.

All the assemblies which are connected to the signal line for charging voltage identification CHARGE_DT are protected via an active shunt regulator SHUNT, that is to say, as soon as the voltage rises above a maximum permissible value, the shunt regulator SHUNT impedance becomes low thus dissipating a sufficient amount of current to ground VSS so that the voltage on the signal line CHARGE_DT cannot rise any further. In this case, the resistor R1 is used for current limiting.

The voltage on the signal line CHARGE_CNTR is always less than the voltage on the signal line CHARGE_DT by the base-emitter voltage of the series transistor that is connected in-between. The assemblies that are connected to the signal line CHARGE_CNTR are therefore also protected against over-voltages.

During operation of the electrical appliance, the voltage that is supplied by the rechargeable battery unit BAT is frequently too high for some integrated sub-micron circuits. However, the voltage of the rechargeable battery unit BAT cannot be reduced on a general basis since other components, such as LEDs, LCDs, RF components or audio components, require a correspondingly high voltage. For this reason, both the relatively high voltage on the signal line VDDBAT and lower voltages must be available. The lower voltages are supplied by a voltage regulation unit VREG. For this purpose, the input of the voltage regulation unit VREG is connected to the signal line VDDBAT. The voltage regulation unit VREG may be located on the IC, together with the charging control unit PMU. A lower supply voltage can be tapped off at the low-voltage output VDDLO of the voltage regulation unit VREG. The voltage at the low-voltage output VDDLO is smoothed by the capacitor C3, which is connected to ground VSS.

Figure 2:
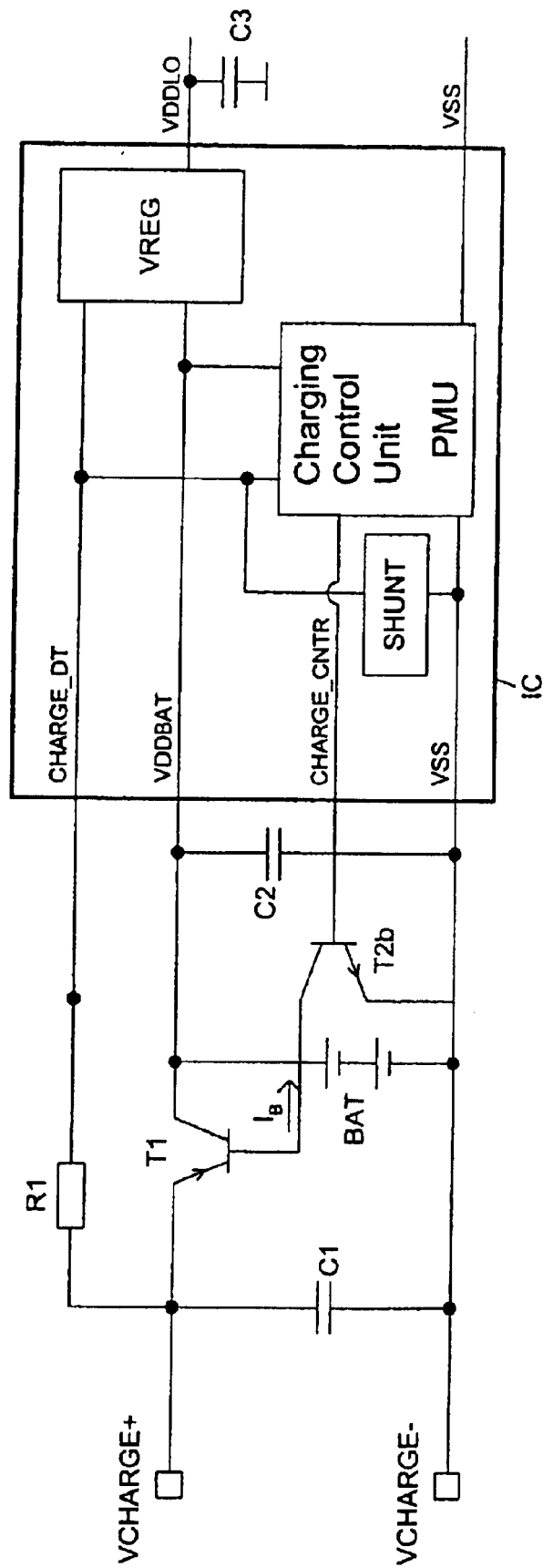
FIG. 2 is a circuit diagram of the second exemplary embodiment of the charging circuit.

The overview circuit diagram of a second exemplary embodiment according to the invention is shown in FIG. 2. This exemplary embodiment differs from the first exemplary embodiment according to the invention only in the circuitry of the series transistor T2. The collector of the series transistor T2b in the second exemplary embodiment is connected to the base of the control transistor T1, and the emitter is connected to ground VSS. The base connection of the series transistor T2b is connected via the signal line CHARGE_CNTR to the charging control unit PMU. In this exemplary embodiment, the series transistor T2b is controlled via its base. When a positive potential is applied to the base of T2b by the charging control unit PMU, then a base current starts to flow through T2b. In consequence, the base current of the control transistor T1 can flow away via the collector-emitter path through T2b to VSS, and the charging current which occurs charges the rechargeable battery unit BAT via T1.

We claim:

1. A charging circuit for charging a rechargeable battery unit with an external charging voltage, with the rechargeable battery unit supplying an electrical appliance with a voltage, the charging circuit comprising:

a charging contact for connecting to the external charging voltage;

a charge regulator for controlling at least one of a current and a voltage profile of a charging process, said charge regulator having a control transistor through which a charging current flows, and a series transistor with a collector-emitter path connected to said control transistor and through said collector-emitter path a control current of said control transistor flows; and a monitoring unit for comparing a signal representing a given voltage applied to the rechargeable battery unit, with a predetermined maximum value, and, if the predetermined maximum value is exceeded, said monitoring unit causing said charge regulator to one of switch off and reduce the given voltage applied to the rechargeable battery unit, said monitoring unit having an input and said collector-emitter path of said series transistor is electrically connected to said input of said monitoring unit.

2. A charging circuit for charging a rechargeable battery unit with an external charging voltage, with the rechargeable battery unit supplying an electrical appliance with a voltage, the charging circuit comprising:

a charging contact for connecting to the external charging voltage;

a charge regulator for controlling at least one of a current and a voltage profile of a charging process, said charge regulator having a control transistor through which a charging current flows, and a series transistor with a collector-emitter path connected to said control transistor and through said collector-emitter path a control current of said control transistor flows;

a monitoring unit for comparing a signal representing a given voltage applied to the rechargeable battery unit, with a predetermined maximum value, and, if the predetermined maximum value is exceeded, said monitoring unit causing said charge regulator to one of switch off and reduce the given voltage applied to the rechargeable battery unit; and a common silicon substrate, said monitoring unit and parts of said charge regulator are implemented on said common silicon substrate, and said control transistor is a discrete component.

3. The charging circuit according to claim 1, wherein said control transistor is a field-effect transistor having a source-drain path through which the charging current flows.

4. The charging circuit according to claim 3, wherein the given voltage applied to the rechargeable battery unit can be adjusted via a gate potential of said control transistor.

5. A charging circuit for charging a rechargeable battery unit with an external charging voltage, with the rechargeable battery unit supplying an electrical appliance with a voltage, the charging circuit comprising:

a charging contact for connecting to the external charging voltage;

a charge regulator for controlling at least one of a current and a voltage profile of a charging process, said charge regulator having a control transistor being a bipolar transistor having a collector-emitter path through which a charging current flows, and a series transistor with a collector-emitter path connected to said control transistor and through said collector-emitter path of said series transistor a control current of said control transistor flows; and a monitoring unit for comparing a signal representing a given voltage applied to the rechargeable battery unit, with a predetermined maximum value, and, if the predetermined maximum value is exceeded, said monitoring unit causing said charge regulator to one of switch off and reduce the given voltage applied to the rechargeable battery unit, the given voltage being adjusted via the control current being a base current of said control transistor, and in a situation where the signal representing the given voltage applied to the rechargeable unit exceeds the predetermined maximum value, the base current of said control transistor is one of switched off and reduced.

6. The charging circuit according to claim 1, further comprising a timer for controlling a start and an end of the charging process.

7. The charging circuit according to claim 1, wherein the charging circuit controls the charging process in dependence on at least one of a state of charge and a charge capacity of the rechargeable battery unit.

8. The charging circuit according to claim 1, wherein the external charging voltage is connected to the rechargeable battery unit in a pulsed mode.

9. The charging circuit according to claim 1, wherein said monitoring unit has an analog/digital converter for digitizing the signal representing the given voltage applied to the rechargeable battery unit.

10. The charging circuit according to claim 1, further comprising a signal line connected to the electrical appliance and identifying a charging voltage, and through said signal line the electrical appliance can be supplied with the voltage.

11. The charging circuit according to claim 1, further comprising a signal line for identifying a charging voltage, said signal line connected to said base connection of said series transistor.

12. The charging circuit according to claim 10, further comprising a shunt regulator connected to said signal line, and any over-voltages occurring on said signal line for the charging voltage are dissipated by said shunt regulator.

13. The charging circuit according to claim 1, further comprising a signal line for identifying a charging voltage, and from said signal line it is possible to measure whether the external charging voltage is present.

14. The charging circuit according to claim 10, wherein said signal line for identifying the charging voltage is decoupled from the rechargeable battery unit while determining if the external charging voltage is present.

15. The charging circuit according to claim 1, wherein:
said monitoring unit has a charging control unit; and
said series transistor has an emitter electrically connected to said charging control unit.

16. An electrical appliance, comprising:
a rechargeable battery unit; and
a charging circuit connected to said rechargeable battery unit, said charging circuit containing:
a charging contact for connecting to an external charging voltage;
a charge regulator for controlling at least one of a current and a voltage profile of a charging process, said charge regulator having a control transistor through which a charging current flows, and a series transistor with a collector-emitter path connected to said control transistor and through said collector-emitter path a control current of said control transistor flows; and
a monitoring unit for comparing a signal representing a given voltage applied to said rechargeable battery unit, with a predetermined maximum value, and, if the predetermined maximum value is exceeded, said monitoring unit causing said charge regulator to one of switch off and reduce the given voltage applied to said rechargeable battery unit, said monitoring unit having an input and said collector-emitter path of said series transistor is electrically connected to said input of said monitoring unit.

* * * * *